United States Patent [19]

Biethan et al.

[11] 4,212,013
[45] Jul. 8, 1980

[54] DUPLEX-TRANSMITTER RECEIVER ARRANGEMENT

[75] Inventors: Gunter Biethan, Neuried; Peter Kloeber, Munich, both of Fed. Rep. of Germany

[73] Assignee: Siemens Aktiengesellschaft, Berlin & Munich, Fed. Rep. of Germany

[21] Appl. No.: 944,363

[22] Filed: Sep. 21, 1978

[30] Foreign Application Priority Data

Sep. 30, 1977 [DE] Fed. Rep. of Germany ....... 2744212

[51] Int. Cl.² .............................................. H04B 1/40
[52] U.S. Cl. ......................................... 370/30; 375/7
[58] Field of Search ............... 343/175, 176, 177, 178, 343/179, 180; 325/15, 17, 20, 21, 25, 7, 8, 9, 11

[56] References Cited

U.S. PATENT DOCUMENTS

| | | | |
|---|---|---|---|
| 2,939,139 | 5/1960 | Handler | 343/178 |
| 3,426,279 | 2/1969 | Berman | 343/179 |
| 4,134,068 | 1/1979 | Richardson | 325/20 |

*Primary Examiner*—Bernard Konick
*Assistant Examiner*—Joseph A. Popek
*Attorney, Agent, or Firm*—Hill, Van Santen, Steadman, Chiara & Simpson

[57] ABSTRACT

A duplex-transmitter-receiver arrangement wherein only a single oscillator is utilized for the transmitter and receiver for a digitally modulated radio communication system wherein each location has a transmitter and receiver and a single oscillator is used for both the transmitter and receiver with a circulator switch connected respectively to the antenna, the receiver and the transmitter with the oscillator in the transmitter coupling through to the branch for the receiver so as to serve as a mixing frequency for the receiver.

6 Claims, 4 Drawing Figures

DUPLEX-TRANSMITTER RECEIVER ARRANGEMENT

BACKGROUND OF THE INVENTION

1. Field of the Invention

This invention relates in general to duplex-transmitter-receiver apparatus and in particular to apparatus wherein only a single oscillator is utilized for the transmitter and receiver for a digitally modulated radio communication system and wherein a number of stations are capable of communicating in the communication system with a transmitter and receiver at each station for transmitting communication and telemetry.

2. Description of the Prior Art

In transmitter-receiver equipment operating in full duplex operation, the utilization of separate oscillators for the transmitter and receivers requires substantial technical and financial expense particularly when the transmitter and receiver equipment operates in the microwave range. A considerable simplification of the technical problems and financial outlay results when a single local oscillator for both the transmitter and receiver is utilized. However, a number of problems occur in that the transmitter modulation produces undesirable intermodulation products in the receiver branch which interfere with the successful operation of the equipment.

SUMMARY OF THE INVENTION

The invention has the principle objective to provide a duplex transmitter-receiver device utilizing a single oscillator for both the transmitter and receiver wherein the undesirable intermodulation frequencies in the receiver can be easily eliminated.

In a first embodiment, this objective is accomplished by the use of electronic switches which are controlled by the binary modulation signals of the transmitter and the switches are connected into the receiver branch with two inputs and one output with the inputs connected to the outputs of filter circuits tuned to the IF (Intermediate Frequency) combination frequencies of the receiver mixer and the filters connected in parallel in the receiver and with their outputs connected through the switches to a demodulator.

A further feature of the invention is that the frequency deviations for both the transmitter and receiver are the same. This results in only three different combination frequencies and the circuit can be relatively simple and the cost is further reduced.

A second inventive embodiment provides that in the receiver branch a second mixer is connected at the output of the receiver mixer and a low frequency auxiliary oscillator is utilized which is connected through a second mixer and the frequency of the auxiliary oscillator selected such that one of the three IF combination frequency formed from the transmitter and receiver mixed frequencies is eliminated. The output of the second mixer is connected to a demodulator by way of two filter circuits which are in parallel.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

DESCRIPTION OF THE PREFERRED EMBODIMENTS

Figure 1:
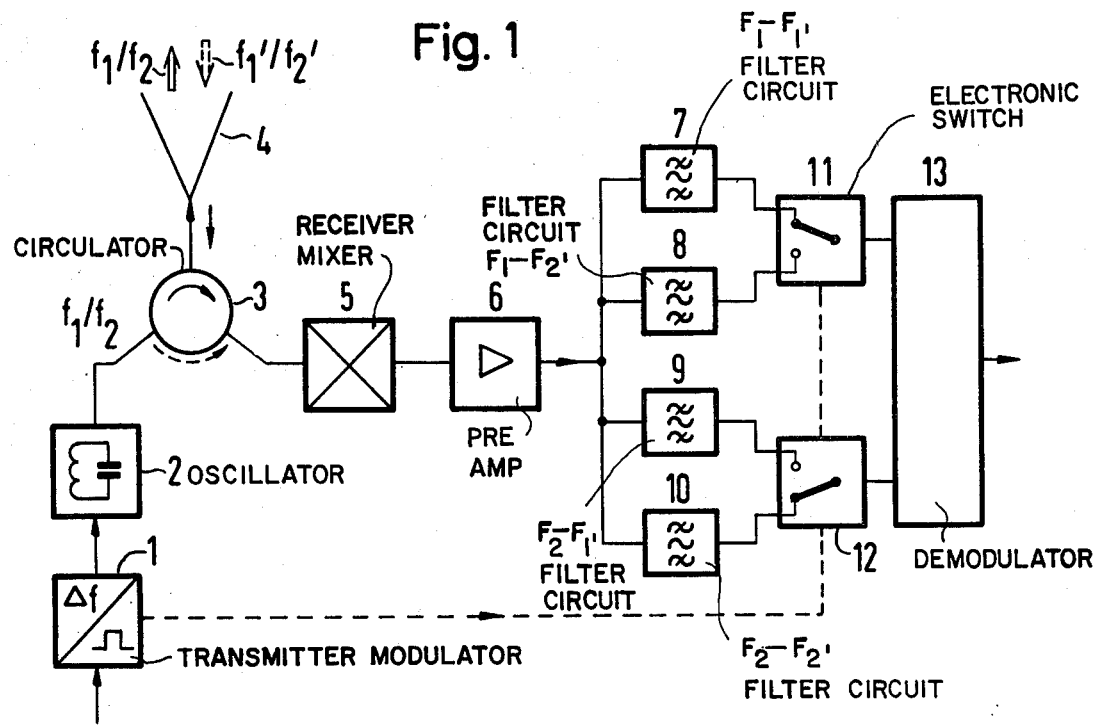
FIG. 1 comprises a block diagram of the transmitter-receiver of the invention.

FIG. 1 illustrates a duplex-transmitter-receiver device according to the invention wherein a transmitter modulator in the transmitter portion of the equipment receives binary data and which provides an output to an oscillator 2 that might, for example, be a gunn type oscillator that converts the signal to a carrier transmitter frequency at frequencies $f_1/f_2$ and conveys it to one input of a three arm circulator 3. An antenna 4 is connected to a second arm of the circulator 3 following in the transmission direction so that the output of the oscillator 2 is radiated and the antenna radiates signals at the frequencies $f_1/f_2$ and receives incoming signals at frequencies $f_1'/f_2'$. The receiver frequencies $f_1'/f_2'$ from the antenna 4 reach the circulator and are supplied to a third arm of the circulator 3 which is connected to the receiver mixer 5. The output of the receiver mixer 5 is connected to a pre-amplifier 6 and the output of the pre-amplifier 6 is connected to a filter bank comprising filter circuits 7, 8, 9 and 10 connected in parallel at their inputs. A first electronic switch 11 receives inputs from the filters 7 and 8 and supplies an output to a demodulator 13. A second electronic switch 12 receives at its input the output of the filters 9 and 10 and supplies an output to the demodulator 12. A control line shown in dashed lines in the FIGS. is connected from the transmitter modulator 1 to the two electronic switches 11 and 12 as shown.

A portion of the output transmitter oscillator 2 at a frequency of $f_1/f_2$ is coupled into the receiver mixer 5 through the circulator 3 and is attenuated by the decoupling attenuation of the circulator and this is illustrated by the dashed arrow in FIG. 1. This input from the oscillator 2 is utilized in the receiver mixer as a mixing signal. Four combination frequencies $f_1-f_1'$, $f_1-f_2'$, $f_2-f_1'$ and $f_2-f_2'$ are formed in the receiver mixer 5 and are supplied to the pre-amplifier 6 where they are amplified and supplied to the inputs of the filter circuits 7 through 10 which are tuned to the IF combination frequencies of the receiver mixer. Depending upon the modulation at the transmitter, the four channels containing the filter circuits are switched by way of the electronic switches 11 and 12 that are controlled by the transmitter modulator 1 such that the correct combination frequencies are respectively supplied to and detected in the demodulator detector 13 which depends upon the desired transmitting and receiving frequencies $f_1$, $f_2$, $f_1'$, and $f_2'$.

Figure 2:
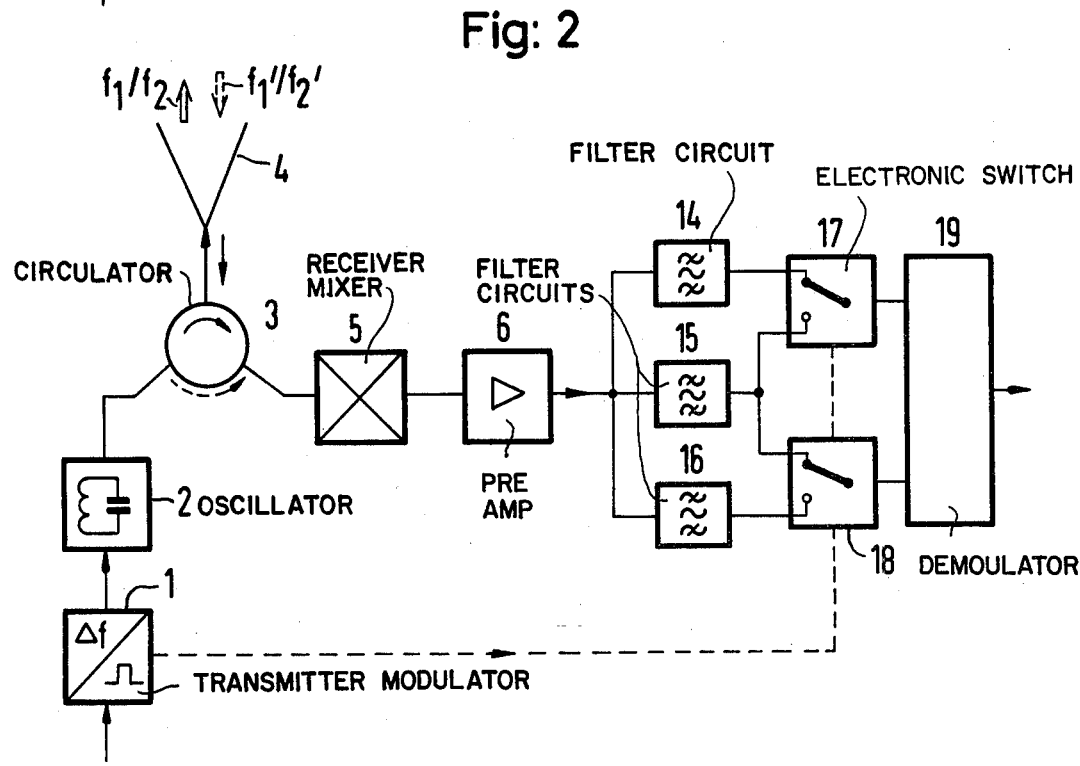
FIG. 2 illustrates a modification of the invention.

FIG. 2 illustrates a modification of the invention which has been simplified relative to the circuit illustrated in FIG. 1. The simplification is obtained when the frequency deviation $\Delta f$ for the transmitter and receiver of frequencies such as $\Delta f = f_1 - f_2$ or $\Delta f = f_1' - f_2'$ and these values are equal. When this occurs only three different combination frequencies exist as, for example,

| |
|---|
| $f_1 - f_1' = 2$ MHz |
| $f_2 - f_1' = 5$ MHz |
| $f_1 - f_2' = 5$ MHz |
| $f_2 - f_2' = 8$ MHz |

In the embodiment illustrated in FIG. 2, where like elements in FIG. 1 are designated by the same numbers, three filter circuits 14, 15 and 16 are connected to the output of the pre-amplifier 6 and a pair of electronic switches 17 and 18 receives the outputs of the filters 14, 15 and 16 with the output of the filter 14 being connected to the input of switch 17 and the output of the filter 15 being supplied both to the input of the switch 17 as well as the input of the switch 18 and the output of the filter 16 being supplied to an input of the switch 18. The demodulator 19 is connected to the outputs of the switches 17 and 18 and the switches 17 and 18 are controlled by the output of the transmitter modulator 1 by the dashed lines as shown.

Figure 3:
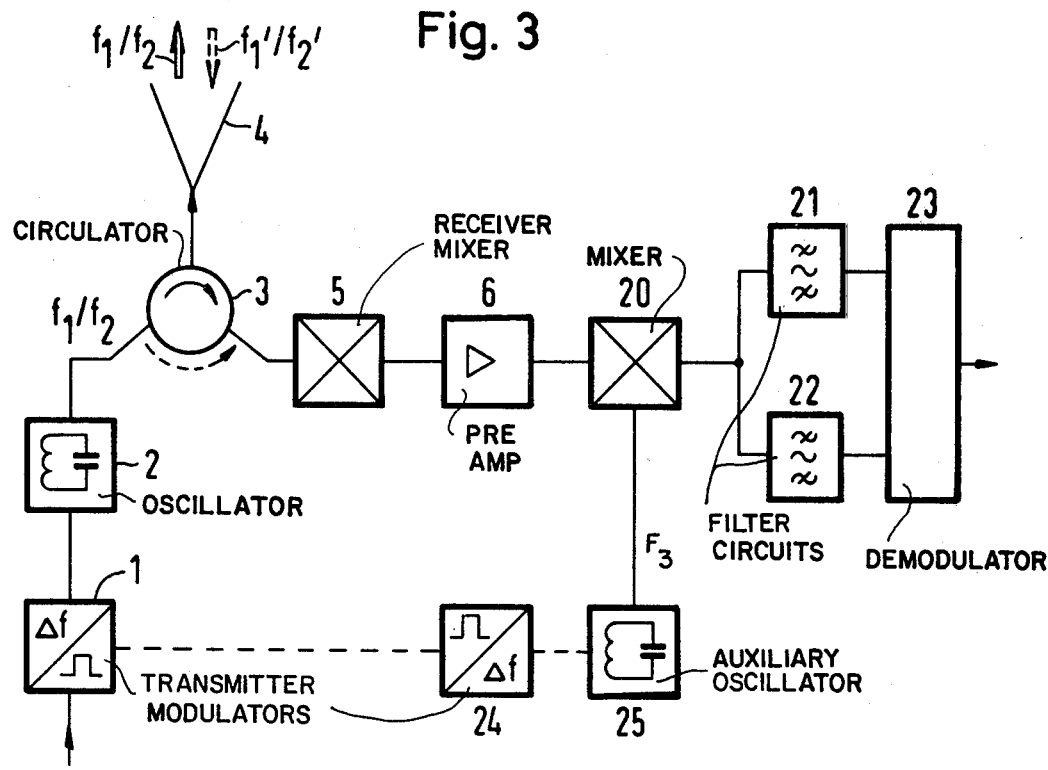
FIG. 3 illustrates a further modification of the invention.

FIG. 3 illustrates a further modification of the invention of the duplex-transmitter-receiver device and in this arrangement an auxiliary oscillator 25 supplies an input to a mixer 20 in the receiver path which receives an output of the receiver pre-amplifier 6. It is to be noted that the switches of FIGS. 1 and 2 have been eliminated in the arrangement of FIG. 3 so as to eliminate the transmitter modulation which results in undesirable combination frequencies in the receiver branch.

The transmitter branch as in FIGS. 1 and 2 includes the transmitter modulator 1 to which the binary data is supplied which supplies an output to the local oscillator 2 which might be, for example, a gunn oscillator which is connected to one arm of the three arm circulator 3. The transmitter frequencies $f_1/f_2$ of the transmitter branch reach the second arm which is connected to the receiver mixer 5 and pass through direction through the circulator 3 and the second arm is connected to the transmitter-receiver antenna 4. A receiver mixer 5 is connected to the third arm of the circulator 3 and supplies an output to the pre-amplifier 6 which supplies an input to the mixer 20 to which the output of the low frequency auxiliary oscillator 25 is supplied. Additionally, of course, the IF combination frequencies from the receiver mixer 5 are connected to the mixer 20. The auxiliary oscillator 25 at the pulse repetition of the binary transmitter modulation is connected by means of the transmitter modulator 24 which is connected to the transmitter modulator 1. Of the three IF combination frequencies forming respectively one of the combinations will be eliminated depending upon the transmitter modulation frequency. A filter bank consisting of the two filter circuits 21 and 22 receive the output of the mixer 20 and are connected with their inputs in parallel and their outputs are connected to a demodulator 23 and in the case of digitally modulated radio transmission systems utilizing frequency shift keying techniques (FSK) the demodulator 23 would be a FSK demodulator. The binary output of the receiver is supplied at the output of the demodulator 23.

The systems described in FIGS. 1, 2 and 3 for digitally modulated radio systems can be broadened to include additional frequencies whereby the number of the filter circuits and electronic switches can be increased according to the increased number of combination frequencies formed in the receiver mixer.

Figure 4:
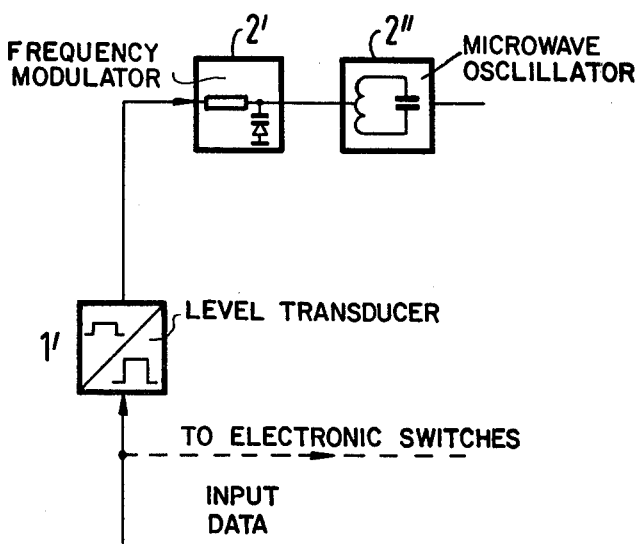
FIG. 4 is a detail view of certain of the components illustrated in FIGS. 1 through 3.

FIG. 4 is a partial schematic illustration illustrating the detailed design of the transmitter modulator 1 and the oscillator 2 in the transmitter branch of the transmitter receiver illustrated in FIGS. 1 through 3. The input signal of the transmitter branch, for example, binary transmitter data are supplied to the level transducer 1' as well as to the electronic switches 11 and 12 in FIG. 1, 17 and 18 in FIG. 2 as shown in the dashed line connections or in the embodiment of FIG. 3 these signals are supplied to the second mixer 20 through the transmitter modulator 24 and the auxiliary oscillator 25.

The modulation of the transmitter signal results in the frequency modulator 2' which receives the output of the transducer 1' and supplies an output to the microwave oscillator 2" as illustrated in FIG. 4.

Although the invention has been described with respect to preferred embodiments, it is not to be so limited as changes and modifications may be made therein which are within the full intended scope of the invention as defined by the appended claims.

We claim as our invention:

1. A duplex-transmitter-receiver apparatus having only one oscillator for the transmitter and receiver of a digitally modulated radio system for communication transmission between a plurality of transmitter-receiver stations mounted at prescribed distances for bidirectional communication and telemetry transmission, comprising a circulator, an antenna connected to said circulator, an oscillator tunable to frequencies $f_1$ and $f_2$ connected to said circulator for radiating signals at frequencies $f_1$ and $f_2$ from said antenna, a receiver mixer connected to said circulator and receiving signals at least at frequencies $f_1'$ and $f_2'$ from said antenna and signals at frequencies $f_1$ and $f_2$ from said oscillator, means for modulating said oscillator, a plurality of filter circuits connected to the output of said receiver mixer and respectively tuned to have center frequencies $f_1-f_1'$, $f_1-f_2'$, $f_2-f_1'$ and $f_2-f_2'$, a demodulator, and electronic switch means supplying inputs to said demodulator and receiving the outputs of said plurality of filter circuits and controlled by said modulating means and said switch means controlled so that if a transmitting frequency of $f_1$ is used and it is desired to tune the receiver to $f_1'$, the filter circuit with a center frequency at $f_1-f_1'$ will be connected to the demodulator, and when the transmitting frequency is $f_1$ and the desired receiver frequency is $f_2'$, the filter circuit with a center frequency of $f_1-f_2'$ will be connected to the demodulator, and when the transmitting frequency is $f_2$ and the desired received frequency is $f_1'$ the filter with a center frequency of $f_2-f_1'$ will be connected to the demodulator, and when the transmitting frequency is $f_2$ and the desired received frequency is $f_2'$ the filter with a center frequency of $f_2-f_2'$ will be connected to the demodulator.

2. A transmitter-receiver apparatus according to claim 1, characterized in that the frequency deviation $\Delta f$ in the transmitter is equal to the frequency deviation $\Delta f'$ in the receiver $(f_1-f_2=f_1'-f_2')$.

3. A duplex-transmitter-receiver apparatus according to claim 1 wherein said transmitter is tunable to a plurality of frequencies $f_1/f_2$ and the receiver can be tuned to at least as many frequencies $f_1'/f_2'$ as the transmitter and the IF combination frequencies of the receiver mixer output are equal to the difference between each of said frequencies to which said transmitter can be tuned and each of the frequencies to which said receiver can be tuned.

4. A duplex-transmitter-receiver apparatus according to claim 3 wherein if none of the frequency differences between the transmitter frequencies $f_1/f_2$ and receiver frequencies $f_1'/f_2'$ are the same there is provided one electronic switch for each pair of said plurality of filter circuits.

5. A duplex-transmitter-receiver apparatus according to claim 3 wherein if one or more of the frequency differences between the transmitter frequencies $f_1/f_2$ and receiver frequencies $f_1'/f_2'$ are the same, a single filter circuit can be connected to the demodulator to supply said same frequency differences.

6. A transmitter-receiver apparatus having only one oscillator for the transmitter of a digitally modulated radio system for communication transmission between a plurality of transmitter-receiver stations mounted at prescribed distances for bidirectional communication and telemetry transmission, comprising, a circulator, an antenna connected to said circulator, a first oscillator tunable to frequencies $f_1/f_2$ connected to said circulator for radiating signals at frequencies $f_1$ and $f_2$ from said antenna, a first receiver mixer connected to said circulator and receiving signals at least at frequencies $f_1'$ and $f_2'$ from said antenna and signals at frequencies $f_1$ and $f_2$ from said first oscillator, means for modulating said first oscillator, a second receiver mixer receiving the output of said first mixer, an auxiliary oscillator supplying an input to said second receiver mixer at a frequency of $f_3$, and a pair of filter circuits connected to the output of said second receiver mixer and having center frequencies of $f_2-f_1'$ and $f_2-f_2'-f_3$ and a demodulator connected to the output of said pair of filter circuits.

* * * * *